(12) United States Patent
Rewis et al.

(10) Patent No.: US 12,045,793 B2
(45) Date of Patent: *Jul. 23, 2024

(54) TOKEN MANAGEMENT AND HANDLING SYSTEM

(71) Applicant: First Data Corporation, Greenwood Village, CO (US)

(72) Inventors: Benjamin Rewis, Oakland, CA (US); Vijay K. Royyuru, Norristown, PA (US); Christopher T. Cox, Atlanta, GA (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/162,272

(22) Filed: Jan. 29, 2021

(65) Prior Publication Data

US 2021/0150504 A1 May 20, 2021

Related U.S. Application Data

(63) Continuation of application No. 15/065,764, filed on Mar. 9, 2016, now Pat. No. 10,949,826.

(60) Provisional application No. 62/131,730, filed on Mar. 11, 2015.

(51) Int. Cl.
| | |
|---|---|
| *G06Q 20/20* | (2012.01) |
| *G06Q 20/12* | (2012.01) |
| *G06Q 20/32* | (2012.01) |
| *G06Q 20/34* | (2012.01) |
| *G06Q 20/36* | (2012.01) |
| *G06Q 20/38* | (2012.01) |

(52) U.S. Cl.
CPC .......... *G06Q 20/204* (2013.01); *G06Q 20/12* (2013.01); *G06Q 20/20* (2013.01); *G06Q 20/327* (2013.01); *G06Q 20/357* (2013.01); *G06Q 20/367* (2013.01); *G06Q 20/3674* (2013.01); *G06Q 20/385* (2013.01)

(58) Field of Classification Search
None
See application file for complete search history.

(56) References Cited

U.S. PATENT DOCUMENTS

| | | | |
|---|---|---|---|
| 6,138,917 A | 10/2000 | Chapin, Jr. | |
| 8,935,802 B1 | 1/2015 | Mattsson et al. | |
| 2005/0192895 A1 | 9/2005 | Rogers et al. | |
| 2008/0319905 A1 | 12/2008 | Carlson | |
| 2010/0185545 A1 | 7/2010 | Royyuru et al. | |
| 2011/0024496 A1 | 2/2011 | Nicaise | |
| 2011/0154466 A1 | 6/2011 | Harper et al. | |
| 2014/0344149 A1* | 11/2014 | Campos | G06Q 20/3674 705/41 |
| 2015/0032626 A1* | 1/2015 | Dill | G06Q 20/4016 705/44 |
| 2015/0112871 A1* | 4/2015 | Kumnick | G06Q 20/382 705/67 |

(Continued)

*Primary Examiner* — Chrystina E Zelaskiewicz

(74) *Attorney, Agent, or Firm* — FOLEY & LARDNER LLP

(57) ABSTRACT

Systems and methods for handling tokens. In one aspect, a token is intercepted by a data processor and a contact is made with a detokenization provider by the data processor. In another aspect, token service is aggregated. In another aspect, tokenization is extended to physical cards, to deter certain kinds of fraud.

17 Claims, 9 Drawing Sheets

(56) References Cited

U.S. PATENT DOCUMENTS

| | | | |
|---|---|---|---|
| 2015/0127547 A1* | 5/2015 | Powell | G06Q 20/382 |
| | | | 705/67 |
| 2015/0254648 A1* | 9/2015 | Clements | G06Q 20/367 |
| | | | 705/41 |
| 2015/0254663 A1* | 9/2015 | Bondesen | G06Q 20/367 |
| | | | 705/44 |
| 2015/0294305 A1 | 10/2015 | Wang | |
| 2015/0339663 A1* | 11/2015 | Lopreiato | G06Q 20/385 |
| | | | 705/69 |
| 2016/0217459 A1* | 7/2016 | Lindner | G06Q 20/367 |
| 2016/0232527 A1* | 8/2016 | Patterson | G06Q 20/405 |

* cited by examiner

TOKEN MANAGEMENT AND HANDLING SYSTEM

CROSS REFERENCE TO RELATED APPLICATIONS

This application is a continuation of U.S. Non-provisional patent application Ser. No. 15/065,764, filed Mar. 9, 2016 and titled "Token Management and Handling System," which claims the benefit of U.S. Provisional Patent Application No. 62/131,730 filed Mar. 11, 2015 and titled "Token Management and Handling System," the entire disclosure of which is hereby incorporated by reference herein for all purposes.

BACKGROUND OF THE INVENTION

The use of portable electronic devices such as smart cellular telephones as payment devices is increasing in popularity. There is a need for improved systems and methods that provide increased security in such transactions and improve the ability of merchants to provide specialized customer services.

SUMMARY OF THE INVENTION

According to one aspect, a system comprises an acquiring computer system and a data processor. The data processor comprises a central processing unit and memory holding instructions executable by the central processing unit. The acquiring computer system receives via an electronic network data originating from a wireless device, the data including a token, and the acquiring computer routes the data to the data processor. The instructions, when executed by the central processing unit, cause the data processor to pass the token directly to a detokenization processor and receive a detokenized account number from the detokenization processor, and to cause the data processor to pass the detokenized account number to the acquiring computer system.

According to another aspect, an acquiring computer system is specially programmed to: receive from a merchant point of sale a token representing an account, the token having been presented in a payment transaction; forward the token to a data processor; receive from the data processor an account number of the account represented by the token; and forward the account number to an electronic payments network in place of the token, for transaction approval.

According to another aspect, an aggregating system comprises a central processing unit, a detokenization gateway, and memory holding data and instructions. The instructions, when executed by the central processing unit, cause the aggregating system to: maintain a mapping of a plurality data token formats and token service providers corresponding to the respective data token formats; receive from a requestor a particular token at the detokenization gateway, the token representing an account; and determine from the mapping which token service provider corresponds to the particular token.

According to another aspect, a transaction card comprises a card body having a first number embossed thereon. The first number identifies an account. The transaction card further comprises a magnetic stripe adhered to the card body, the magnetic stripe having a second number stored thereon. The second number is different than the first and the second number identifies the same account as the first number.

According to another aspect, a system comprises a processor and memory. The memory holds instructions that, when executed by the processor, cause the system to maintain in memory a mapping of tokens to account numbers. At least some account numbers are assigned multiple tokens.

DETAILED DESCRIPTION OF THE INVENTION

Figure 1:
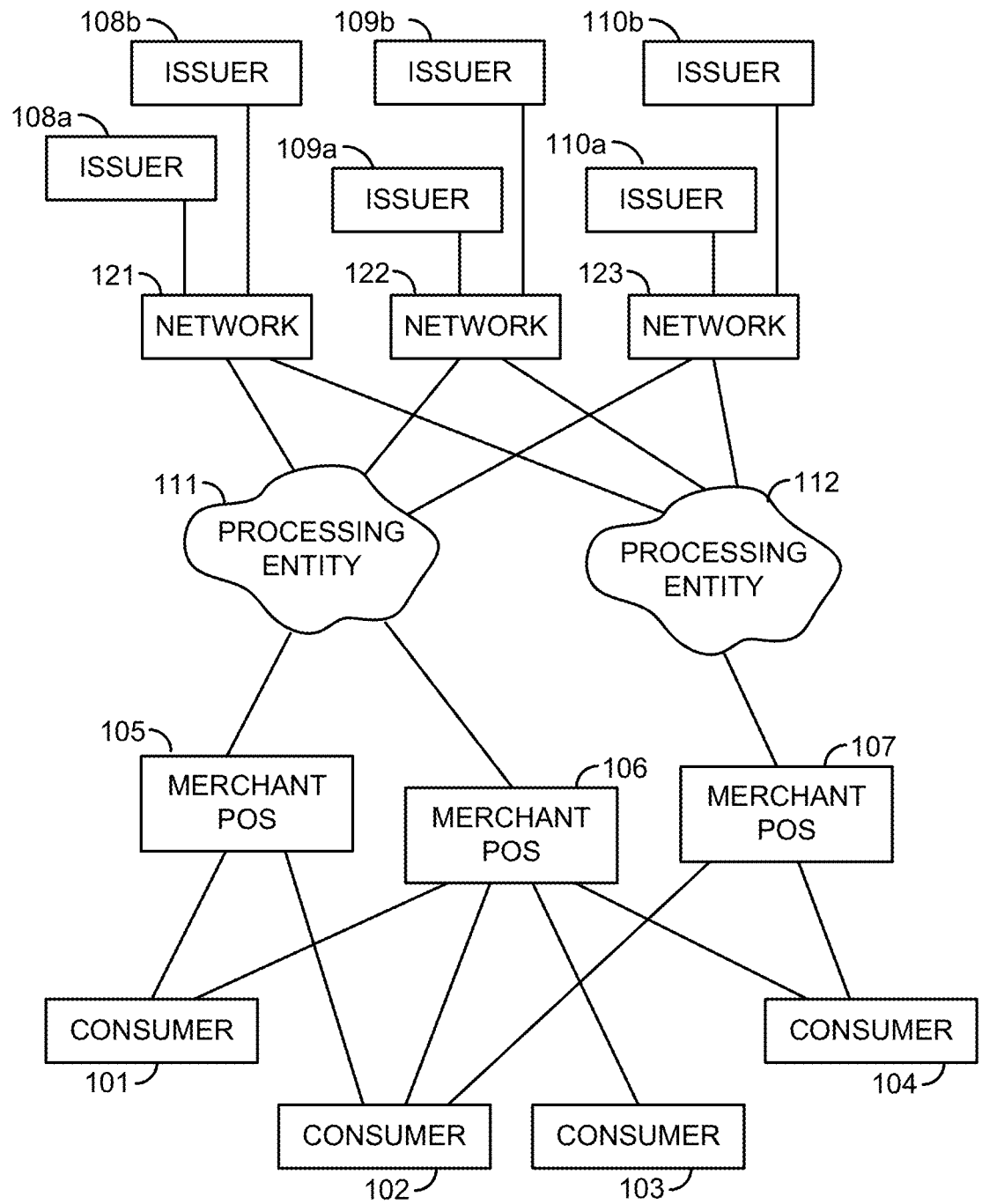
FIG. 1 illustrates a simplified diagram of a portion of a financial infrastructure.

FIG. 1 illustrates a simplified diagram of a portion of a financial infrastructure. In this example, each of consumers 101-104 may wish to make purchases at merchants 105-107 using presentation instruments such as credit cards and debit cards issued by issuers 108a-110b. The diagram of FIG. 1 is simplified, in that in practice there may be many thousands of card issuers, millions of merchants, and hundreds of millions or even billions of consumers in the marketplace. Each merchant 105-107 wishes to accept a wide variety of cards, in order to accommodate many different consumers. But given the large numbers of merchants and issuers, it is impracticable for each merchant to establish a working relationship with each issuer and to maintain equipment to interact with each issuer individually. To simplify the process of accepting presentation instruments, most merchants establish a relationship with a processing entity such as entity 111 or 112.

Each consumer has a pre-existing relationship with the issuer of the payment instrument being used, typically a bank. The bank may extend credit to the consumer, against which the consumer makes purchases with a credit card. In this case, the consumer periodically pays the bank for the purchases, often with funds drawn on a different bank (not shown). Or the issuer bank may hold funds in a debit account and the consumer may make purchases using funds in the account using a debit card.

During a typical purchase transaction, the merchant "swipes" a consumer's card into a payment terminal, also sometimes called a point of sale device or POS device. The payment terminal contacts a processing entity such as processing entity 111, and sends a transaction approval request message that includes the consumer's card number and the amount of the proposed purchase, among other information items. The processing entity determines, based on the card number, which "network" 121, 122, 123 the card is affiliated with, and forwards the approval request to the appropriate network. In this context, a "network" describes a company and an affiliated group of issuers that offer payment instruments branded as affiliated with the network, along with the necessary agreements and hardware infrastructure for administering the network. Examples of networks include the Visa™, MasterCard™, and American Express™ networks and others used mainly in credit card transactions, and NYCE®, Star®, and others used mainly in debit transactions. The network determines which of its affiliated issuers holds the account the consumer wishes to use for payment, and forwards the approval request to the appropriate issuer, for example issuer 108a. The issuer determines whether the consumer has enough available credit (or enough funds on deposit for a debit transaction), and if so, sends an approval message back to the network, which forwards it to the processing entity, which then forwards the approval message to the payment terminal.

For many credit card transactions, the consumer is asked to sign a document at the time of purchase, as a way of authenticating the consumer as the rightful account holder and not someone attempting to make a fraudulent purchase. A typical debit card transaction proceeds a way similar to a credit card transaction. Often for debit cards, authentication of the consumer is done by way of a personal identification number (PIN) entered by the consumer, rather than using a signature.

More detail about payments networks and payment transactions may be found in pending U.S. patent application Ser. No. 11/055,028 of Rogers et al. filed Feb. 9, 2005 and titled "Methods and systems of processing transactions", the entire disclosure of which is incorporated by reference herein.

Figure 2:
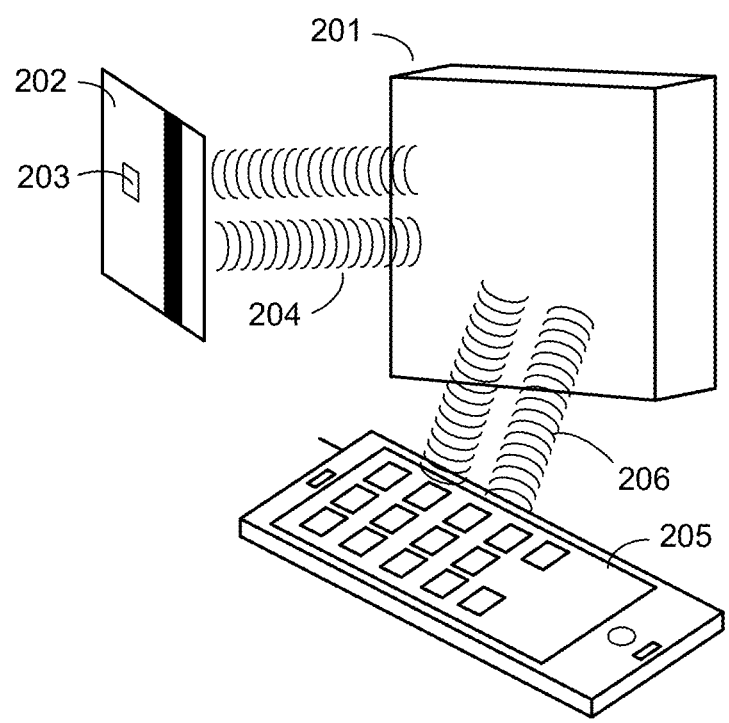
FIG. 2 illustrates the operation of a contactless reader, in accordance with embodiments of the invention.

The introduction of credit and debit cards and EFT networks has greatly improved the efficiency of payments handling, and other improvements to the basic processes described above have also occurred. For example, "contactless" payment systems eliminate the need to "swipe" a card, or even the need for a physical credit or debit card. As is shown in FIG. 2, a wireless reader 201 which is part of a point-of-sale device may read properly-equipped cards such as card 202 when card 202 is simply placed in close enough proximity to reader 201. Information similar to the information stored on the card's magnetic stripe may also be stored on a chip 203 within card 202, and can be transmitted wirelessly 204 from card 202 to reader 201, for example using near field communications (NFC) or similar technology. (Although two payment devices are shown in FIG. 2, typically only one payment device at a time would be presented to reader 201.) The action of holding the card or other device close enough to reader 201 to transfer information may be called a "tap", even though physical contact between the two may not be necessary. In some cases, information from chip 203 may be accessible via electrical contacts exposed on the surface of the card.

It is not necessary that the card account information even be stored on a physical card. For example, it is now possible to store the credit card information on a portable electronic device such as a cellular telephone 205, and to make purchase transactions by simply holding the telephone near reader 201. The account information is transmitted wirelessly 206 to reader 201, as if the information has been read from a physical credit card. The wireless data exchange between telephone 205 and reader 201 typically takes place over a short range wireless link such as an NFC link. For the purposes of this disclosure, a "short range" wireless link is one that does not provide wide area communication capability, but is limited to direct communication with devices in relatively close physical proximity, for example up to a few inches for some short range interfaces or up to a few hundred feet for other short range interfaces. Examples of short range wireless link implementations include NFC, RFID, Bluetooth™, WiFi™ wireless communication systems. An example of a wireless communication link that is not considered short range is the cellular radio transceiver within a cellular telephone.

Other methods of data exchange between a payment device and a reader are also possible. For example, a device having a display screen may display payment information as a QR code (a form of two-dimensional bar code), and the reader may read the QR code using a camera or scanner.

Some consumers may find it convenient to use a mobile device such as cellular telephone as a payment device, as many consumers constantly carry their cellular telephones and use them for a variety of purposes other than telephone calls. Preferably, cellular telephone 205 is a "smart" phone having a processing system and sophisticated display, so that additional capabilities can be installed on the telephone 205 in the form of software applications (often called "apps"). The card information may be stored in a special memory location on the contactless device having very limited access privileges to thwart theft of the information. This location may be called a "secure element" in some cases, for example in some devices equipped with NFC capability.

Because of the close analogy to physical cards, the terms "card account" and "card information" and the like may sometimes be used to refer to accounts and information that are processed entirely electronically, without a physical card being present.

In other devices, for example some smart telephones, the data is stored in the telephone's memory and the operation of a card is emulated in software, in a technique called "host card emulation" (HCE). Many security measures may be provided to guard against illicit copying or use of account information. For example, U.S. Patent Application Publication 2010/0185545 of Royyuru et al., titled "Dynamic Primary Account Number (PAN) and Unique Key Per Card" and published Jul. 22, 2010, is incorporated by reference herein in its entirety, and discloses methods for providing encrypted dynamic account numbers.

Whether a mobile device such as a cellular phone stores account information in a secure element or uses host card emulation, the device may store more than one set of account information, allowing the user to pay with different "card" accounts in different transactions. A digital wallet application called a "mobile wallet" or "mWallet" may assist in managing the storage of account information, enabling selection of a particular account to use, and the like.

In addition to the simple credit and debit card accounts described above, may other forms of similar presentation instruments have been developed. For example, many merchants now offer store-branded credit cards that may carry special features. Purchases made at the sponsoring merchant using the store-branded card may accumulate reward points that can be redeemed by the cardholder for future discounts, free merchandise, or the like. Such store-branded cards may also be known as private label credit cards (PLCC).

Another kind of presentation instrument is the stored value card, for example a gift card offered by many merchants. When such a card is purchased, the purchase price is held by the merchant, and the card user (who often has received the card as a gift) can present the card at the merchant to make payment for goods or services. The cost of each purchase is deducted from the stored balance until the balance is depleted. With some gift or other stored value accounts, the stored balance can be replenished.

In addition to the use of a mobile device as a payment device, other kinds of devices may be used in some transactions, for example a tablet, laptop, or desktop computer. These kinds of devices may be especially useful in conducting transactions over the Internet. In this scenario, the user may browse and select items to purchase from a merchant's website, and may enter card information at a "checkout" page. Alternatively, the computer may store information from one or more card accounts in a digital wallet application (an "eWallet") similar to the "mWallet" application described above in relation to mobile devices. The user can select an account from the eWallet to be used for a particular transaction, and the appropriate account information is transmitted to the merchant.

Especially when the user enters card information for a specific purchase, this kind of Internet transaction may be referred to as a "card-not-present" transaction, because the consumer does not present an actual card to the merchant. Another example of a card-not-present transaction is a purchase over the telephone, in which the consumer simply reads his or her account number from a card.

While the above discussion is presented for ease of explanation as if actual account numbers are stored on mobile devices or computers, for example in an mWallet or eWallet, and transmitted during transactions, this is not always the case. For security reasons, it may be preferable that actual account numbers not be stored on devices that may be easily stolen or compromised. For example, while a variety of security measures can be used to increase the security of card-not-present transactions (for example a requirement that the purported cardholder supply a card verification value or CVV read from the back of the card), some merchants may not enforce this requirement. Accordingly, it may be possible for a person illicitly in possession of only an account number to fraudulently make purchases on the account.

In part to help guard against this kind of fraud, mobile devices may not store actual account numbers, but may instead store tokenized versions of the account numbers. A token is a value unique to a particular account that can be used by an authorized entity to recover the actual account number of its associated account, but does not itself reveal the actual account number. Thus, a fraudster in possession of the token cannot perform card-not-present transactions with it.

For purposes of this disclosure, an actual account number may also be referred to as real primary account number (real PAN), and a token may also be referred to as a device primary account number (device PAN).

For reasons of practicability and security, the mapping between actual account numbers and tokens may be compartmentalized to a single entity, called for the purposes of this disclosure a token service provider (TSP).

Figure 3:
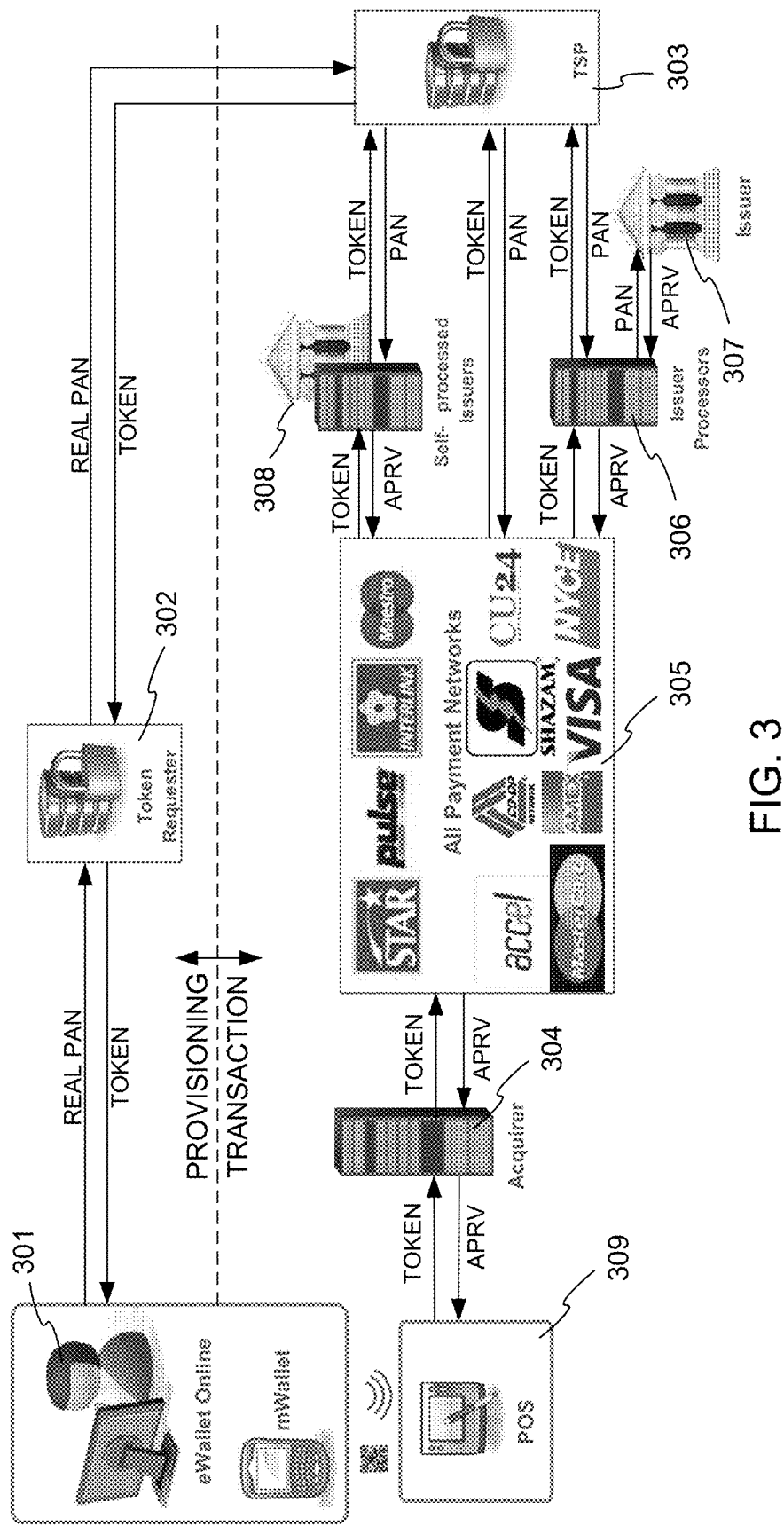
FIG. 3 illustrates the interaction of various entities involved in transactions using tokens, in accordance with embodiments of the invention.

The interaction of various entities involved in transactions using tokens is shown in FIG. 3. A consumer 301 has a previously-established account relationship with an issuer, for example consumer 301 may have a physical credit card issued by a particular bank, and may wish to be able to make payments using his or her mobile phone or computer (instead of the physical card) on the same account.

In a preliminary step, consumer 301 obtains a token to be stored in his or her digital wallet, for example an mWallet or eWallet. Many digital wallets exist, including Apple Pay™ Google Wallet™, Softcard™, PayPal™, and CurrentC™, among others. The process of obtaining and storing a token representing a particular account is known as provisioning. Multiple accounts may be provisioned to the same digital wallet.

To provision an account into his or her digital wallet, consumer 301 may contact an intermediary token requester 302. Token requester 302 may be, for example, an entity that supplies the particular digital wallet application being used by consumer 301, and assists consumers with the setup and use of its digital wallet application. Consumer 301 may contact token requester 302 via a site on the World Wide Web or by another means. Consumer 301 provides account credentials such as a real PAN to token requester 302, which forwards the real PAN to a token service provider 303. Token service provider 303 determines a token to represent the real PAN, passes the token back to token requester 302, which in turn passes the token to the digital wallet of consumer 301 for storage.

Token service provider 303 may provide tokens and token management for a number of token requesters, issuers, and other entities, and keeps a record of which token it has provided represents which actual account.

Token requester 302 may contact token service provider 303 in other circumstances as well, for example to handle "life cycle events" in the life of an account. Examples of life cycle events include the expiration of a token, user cancellation of an account, a report that a device on which a token is stored has been lost or stolen, or the like. In these cases, a token may be replaced with a new token, flagged as no longer valid, or may be the subject of some other action. Like provisioning, such life cycle events occur outside the normal transaction flow.

To make a transaction using an account provisioned to his or her digital wallet, consumer 301 presents the token corresponding to the account during a transaction. For example, consumer 301 may present his or her NFC-equipped cellular telephone to an NFC-equipped reader at a merchant point of sale 309. Or an eWallet application on the user's computer may present the token to a merchant website during a purchase conducted over the Internet. Or the consumer may display a QR code representing the token on his or her smart phone display, and may present the display to a camera-equipped reader at the merchant point of sale 309.

In any event, the token is presented to the merchant as payment for a transaction. The merchant sends the token to a processing entity such as an acquirer using acquiring computer system 304, which in turn transmits the token over credit or debit network "rails" for approval of the transaction by an issuer. In some cases, another intermediate processing entity 306 may reside between the network and the issuer such as issuer 307. In other cases, certain issuers 308 may handle their own transaction processing without an intermediate entity.

Whether the issuer uses an intermediary or not, the issuer needs the real PAN corresponding to the received token, in order to evaluate whether the underlying account has sufficient available credit or funds on deposit to cover the proposed purchase transaction. Processing entity 306 passes the token to token service provider 303, which looks up the corresponding primary account number and passes it back to processing entity 306. This step of determining a real PAN from a token is sometimes called "detokenization". Processing entity 306 passes the real PAN to issuer 307, which can then make a transaction approval decision. Issuer 307 transmits an indication of its decision (labeled "APRV" in FIG.

3) to processor 306, which forwards it through the network 305 to acquiring computer system 304, which informs the merchant of the decision. In the case of self-processing issuer 308, issuer 308 performs the activities of both processor 306 and issuer 307. While only a transaction approval message (APRV) is shown in FIG. 3, an issuer may also deny a transaction, for example if consumer 301 does not have sufficient available credit or funds to support the proposed transaction.

In some circumstances one of networks 305 may communicate directly with token service provider 303, but in general, neither the merchant, acquirer, nor network 305 sees the actual PAN in the system of FIG. 3. These entities see only the token, and therefore do not have sufficient information to identify the consumer.

While merchants may wish to offer wireless device payment options in order to accommodate the widest possible range of customers, the lack of transaction information identifying the consumer may make it difficult for the merchant to implement rewards programs, conduct marketing research, and the like. For example, a merchant may wish to offer a bonus item, a one-time discount, or the like once a particular consumer has spent a threshold dollar amount with the merchant. However, without identifying information about the consumer, the merchant has no way to determine a particular customer's spending level with the merchant.

One option employed by some merchants is to issue a separate loyalty card to consumers who enroll in the merchant's loyalty program. The consumer can then present the separate loyalty card at the time of each purchase, and the merchant can record the amount of the purchase and add it to the consumer's accumulated spending total. However, the requirement of a separate card is inconvenient, and thus largely defeats a major advantage of the use of a mobile digital wallet.

Token Interception

In accordance with embodiments of the invention, an acquirer or other intermediate processing entity may intercept transaction information and tie the transaction to a particular consumer despite the fact that the consumer presented a token as payment rather than a PAN.

Figure 4A:
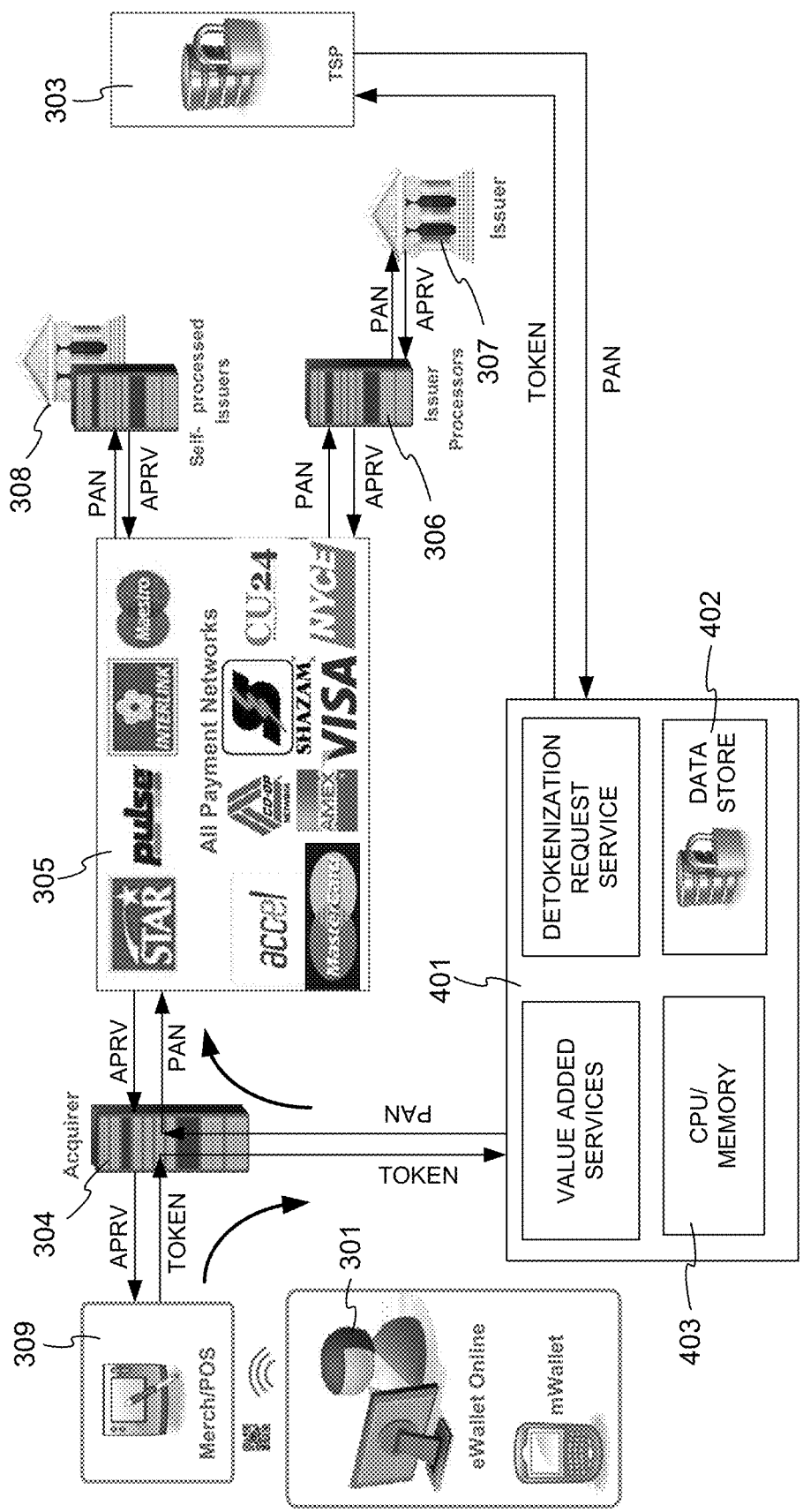
FIG. 4A illustrates a system and process for handling transactions in accordance with embodiments of the invention.

FIG. 4A illustrates a system and process for handling transactions in accordance with embodiments of the invention. In the system of FIG. 4A, an intercepting entity, for example a data processor 401, can intercept the data flow in a transaction and "short circuit" the detokenization process. Data processor 401 may be an independent entity, or may represent functions performed by acquiring computer system 304 or another processing entity. Data processor 401 includes a central processing unit (CPU) 403, and memory holding instructions for the CPU 403. The instructions, when executed by the CPU 403, cause data processor 401 to perform its functions.

Data processor 401 receives the token from the merchant (possibly via acquiring computer system 304), and passes it directly to token service provider 303, which detokenizes it and passes the real PAN back to data processor 401.

Data processor 401 can then pass the PAN to one of networks 305 (possibly via acquiring computer system 304), which forwards it to the appropriate issuer as normal. Network 305 and the issuer may not even be aware that the transaction was performed using a token, as by the time the transaction reaches the network and the issuer, it appears to be a traditional credit card transaction.

Once in possession of the PAN, intercepting entity 401 can perform various functions on behalf of the merchant.

For example, data processor 401 may have a previous relationship with the merchant, in which data processor 401 manages the merchant's loyalty, customer relations management (CRM), rewards, or other programs. Upon enrollment into a loyalty or CRM program, each consumer may provide identifying information to the merchant, and may also provide a credit card account number as a preferred means of payment. The merchant may supply this information to data processor 401, which stores it, for example in a data store 402. Thus the merchant and data processor 401 have information that can identify a particular customer, if the customer's PAN can be determined.

Because data processor 401 intercepts the transaction data and obtains the customer's PAN, data processor 401 can connect the particular transaction with the particular customer, despite the fact that a transaction was initiated using a token, and no interaction between token service provider 303 and networks 305 or issuers 307, 308 may be needed for the particular transaction illustrated. With this information, data processor 401 may perform such services as monitoring a customer's spending levels, purchase frequency, or the like. Data processor may track loyalty points, administer the awarding of bonus offers or the like to particular customers. Many other services may be envisioned.

It will be recognized that a particular consumer may register more than one credit card account with the merchant, and may provision more than one account to his or her digital wallet. The merchant may supply this information to data processor 401, which can then match transactions to a particular consumer despite the fact that the transactions may be initiated by the consumer with different tokens representing different card accounts.

Data processor 401 may assign a customer identification (CID) value to a particular consumer, identifying a particular consumer regardless of which registered account the consumer uses to make payment. For example, the CID may be as assigned by the TransArmor™ system offered by First Data Corporation of Greenwood Village, Colorado, USA. Data processor 401 may provide the CID to the merchant in some embodiments.

In other embodiments, data processor 401 may pass the real PAN back to the merchant. This may be especially useful for merchants who used a consumer's PAN as an identifier in the merchant's CRM, rewards, loyalty, or other program.

Figure 4B:
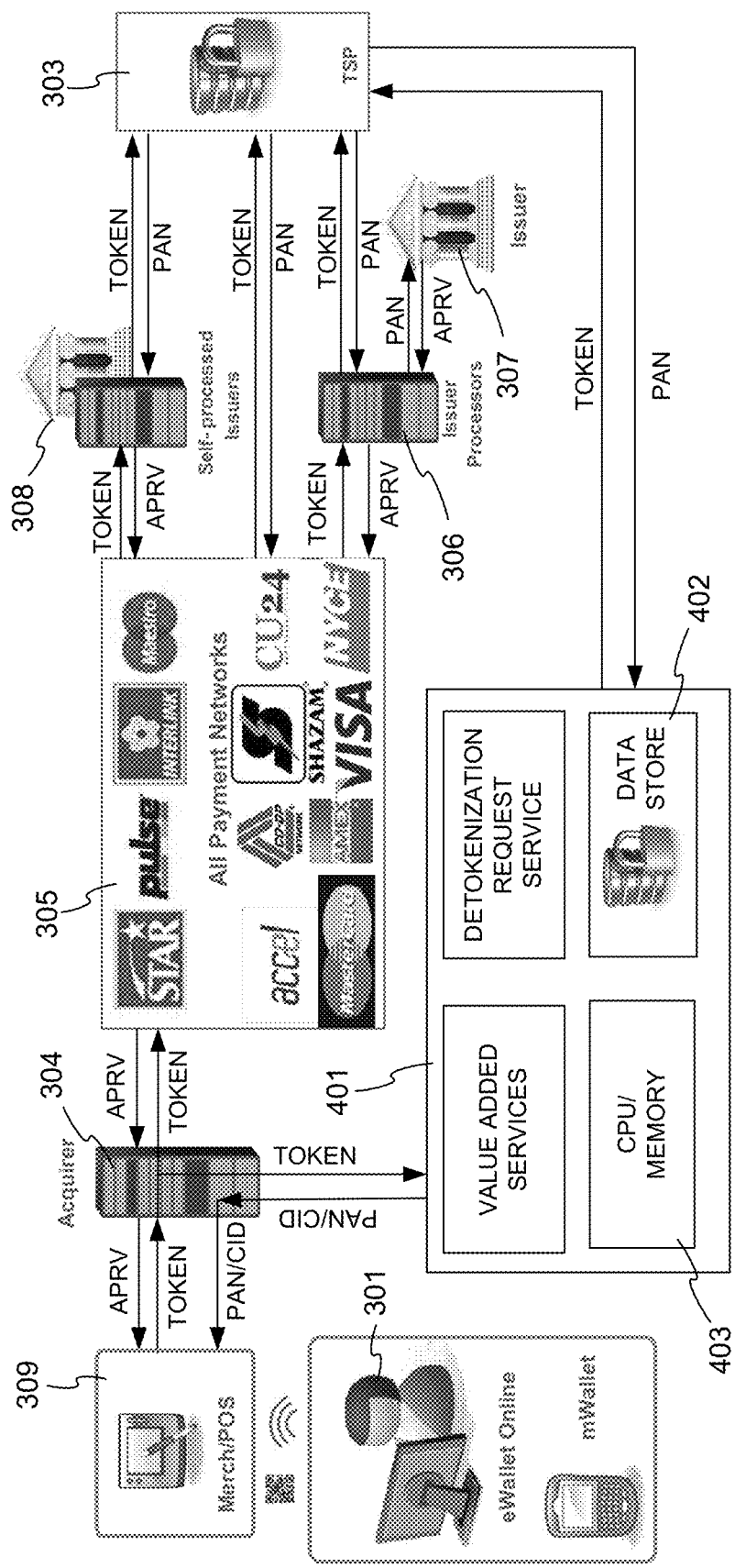
FIG. 4B illustrates another system and process for handling transactions in accordance with embodiments of the invention.

For example, FIG. 4B illustrates an arrangement in which acquiring computer system 304 passes the transaction token both to network 305 and to data processor 401. The token can be used by network 305 and the appropriate issuer to process the transaction in the manner shown in FIG. 3. In addition, data processor 401 may determine a consumer identification (CID) value from the token and may pass the CID back to the merchant.

Token Service Aggregation

While FIGS. 3-4B above show only one token service provider 303, it is possible that there may be a large number of token service providers that perform detokenization and other services on behalf of many different digital wallets or other entities. Thus, the routing of tokens for detokenization may become a "many-to-many" routing problem, which payment networks, issuers, and other parties may not be equipped to efficiently solve.

Figure 5:
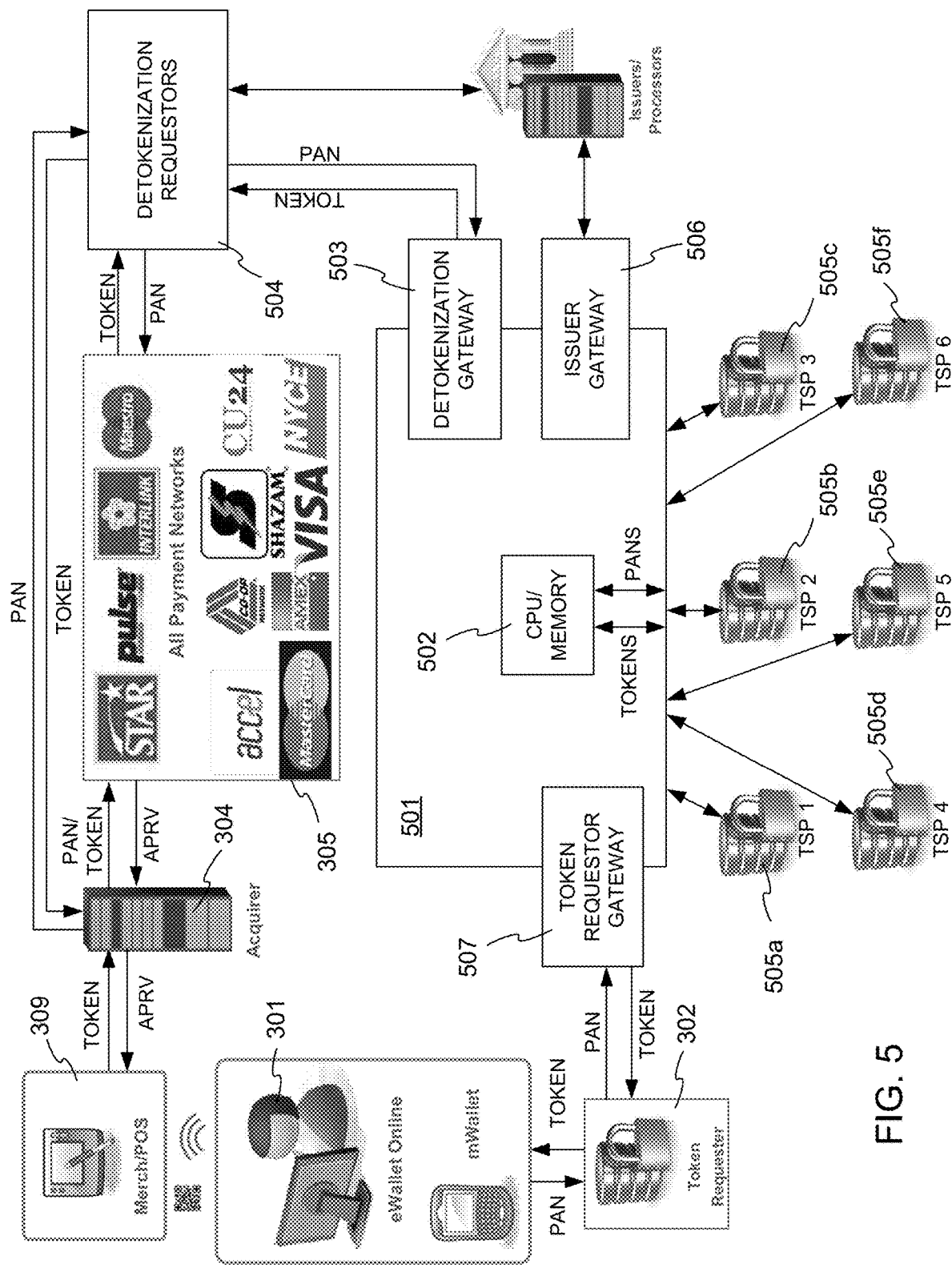
FIG. 5 illustrates the operation of an aggregating system, according to embodiments of the invention.

FIG. 5 illustrates the operation of an aggregating system 501, according to embodiments of the invention. Aggregating system 501 includes a CPU 502 and memory. The memory holds instructions that, when executed by the CPU 502 cause aggregating system 501 to perform various functions.

Aggregating system 501 includes a detokenization gateway 503, by which detokenization requests are received from various detokenization requestors 504. As is explained above, detokenization requestors 504 may include one or more of networks 305, acquiring computer system 304, payment processors, issuers, or other entities. Detokenization gateway 503 may include a network interface and communications protocol for submitting detokenization requests to aggregating system 501.

Each detokenization request includes a token for which the requestor wishes to know the number of the corresponding account. Aggregating system 501 maintains, for example in the memory, a mapping of a plurality data token formats and token service providers corresponding to the respective data token formats. For example, tokens may be viewed as strings of numeric or alphanumeric digits. The first few digits of the string may identify a token service provider that maintains the records of accounts and corresponding tokens for tokens having the particular leading digit string. Different token services providers may maintain records for tokens having different leading strings.

Aggregating system 501 receives detokenization requests via detokenization gateway 503 from a number of detokenization requestors 504, and determines, from the stored mapping, which token service provider corresponds to each received token, from a number of token service providers 505a-505f. While six token service providers 505a-505f are shown, it will be recognized that more or fewer token service providers may be in existence and may receive communications from aggregating system 501. Once the correct token service provider is determined for a particular token, the token is forwarded the respective corresponding token service provider for detokenization. Aggregating system 501 receives from the corresponding token service provider a detokenized account number, and forwards the detokenized account number to the requestor.

Thus, the various detokenization requestors need not maintain records of which token service providers correspond to which tokens, and need not establish relationships with multiple token service providers. Rather, the detokenization requesters need only maintain a relationship with aggregating system 501.

While the above example may be typical of a detokenization request arising from a transaction being conducted by a consumer at a merchant point of sale, aggregating system 501 may include other gateways for mediating communications between the various token service providers 505a-505f and other entities.

For example, aggregating system 501 may receive communications from issuers or issuer processors via issuer gateway 506. Such communications may relate to life cycle events, for example the expiration and/or renewal of a token, the closing of an account, or other events. The function performed by aggregator system 501 for a request received through issuer gateway 506 is similar to the function performed for a detokenization request received through detokenization gateway 503, but may be performed on behalf of a different entity and for a different purpose. That is, aggregating system 501 receives at the issuer gateway from an account issuer a request to modify the status of a second particular token in response to a life cycle event. Aggregating system 501 determines from its stored mapping which token service provider 505a-505f corresponds to the particular token, and forwards the request to modify the status of the second particular token to the token service provider corresponding to the second particular token.

Aggregating system 501 may further include a token requestor gateway 507, for receiving token requests from token requestors 302, for example during provisioning of an account to a consumer's mobile or computer device. In one scenario, aggregating system 501 receives from a token requestor 302 at the token requestor gateway 507 a request for the issuance of a token to correspond to a particular account number. Aggregating system 501 determines from its stored mapping which token service provider corresponds to the particular account number, and forwards the request for issuance of a token to the token to the token service provider corresponding to the particular account number.

Aggregating system 501 may further receive from the token service provider corresponding to the particular account number a token corresponding to the particular account number, and forward the token corresponding to the particular account number to the token requestor, which in turn forwards the token to the consumer device for provisioning to the consumer's digital wallet.

Cross-Domain Fraud Protection

As is discussed above, the use of tokens instead of actual account numbers in mobile commerce protects against certain kinds of fraud. However, in more traditional transactions, opportunities for fraud still exist. For example, a typical physical credit card includes an embossed account number, has the account number also encoded on the card's magnetic strip, and may also have the account number encoded on an electronic chip that can be read by a short range wireless reader such as an NFC reader or by a contact reader at a merchant point of sale. These versions of the account number are the actual account number, and are not encrypted. Thus, a person who illicitly learns of the account number may be able to perform fraudulent transactions on the account, for example card-not-present transactions vie telephone or the Internet.

Account numbers can be illicitly compromised different ways. For example, an account number may be simply read from the face of a card. In another example, some thieves install "skimmers" on automatic teller machines (ATMs) that read the magnetic stripe of a card as it is inserted into an ATM. The card number can be recovered from the magnetic stripe information, and used to conduct fraudulent transactions. In other cases, account numbers can be "sniffed" from wireless-capable cards by surreptitiously reading the embedded chips, for example from the cardholder's pocket in a crowded setting.

Figure 6A:
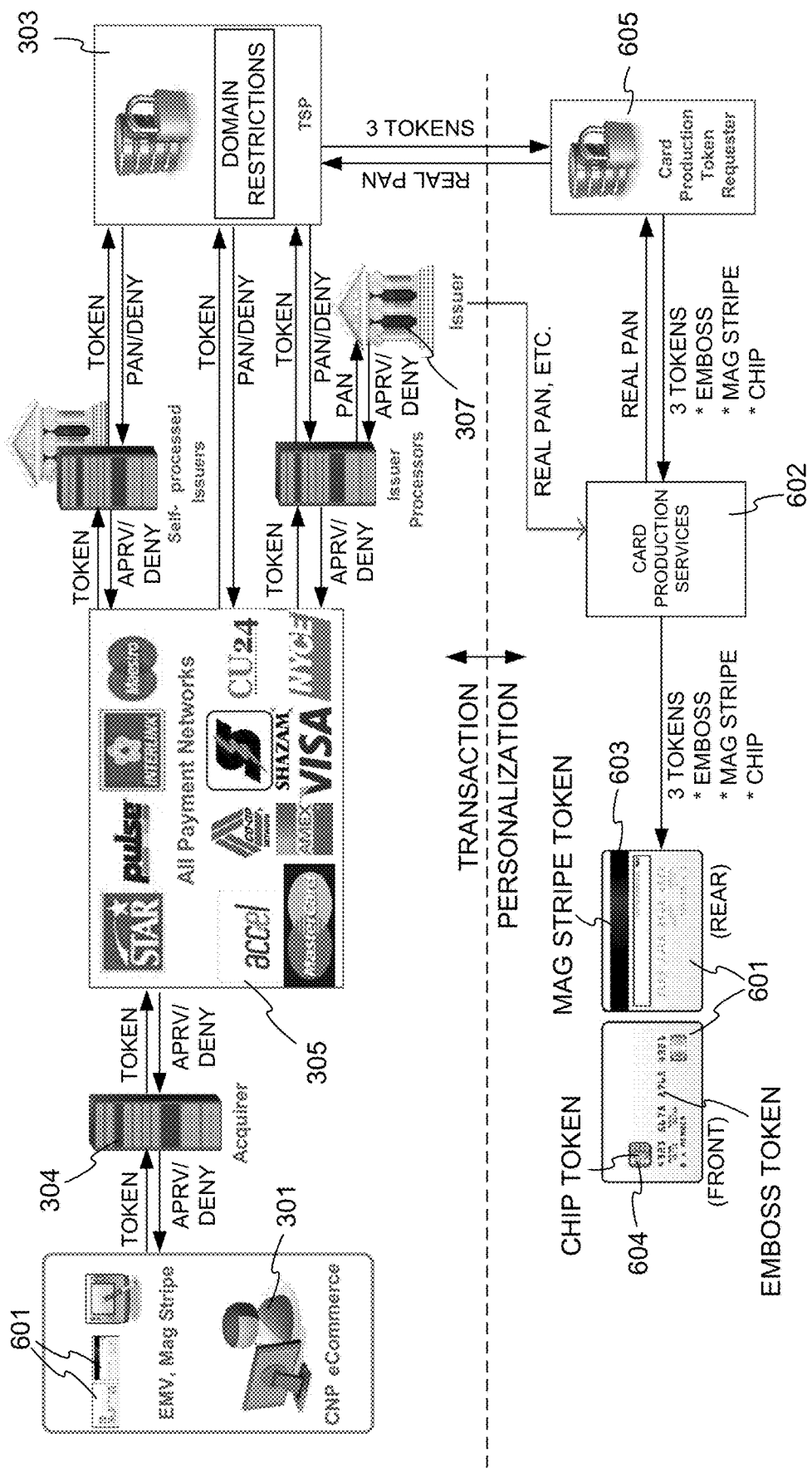
FIG. 6A shows the interactions of certain entities in an example embodiment.

According to other embodiments of the invention, the use of tokenization is extended to physical cards. FIG. 6A shows the interactions of certain entities in an example embodiment.

In the example of FIG. 6A, issuer 307 wishes to establish one or more credit card accounts, including an account with consumer 301. Once consumer 301 has been approved for credit and issuer 307 has collected any information needed to open the account, issuer 307 may produce or cause to be produced an actual credit card 601. Both front and rear views of card 601 are shown in FIG. 6A. (While card 601 is described as a credit card, the invention may be embodied in a debit card as well.)

Typically, an issuer such as issuer 307 will issue many accounts at a time, and will send a data file to a card producer 602, with sufficient information to produce individualized cards for the new account holders. The data file may include, for example, the consumer's name and account number for each new account. The process of producing individualized cards having specific consumer information is often called personalization, as before the process, the cards are identical and blank, but after the process each card is unique due to the unique information stored on it.

Historically, the actual account number (real PAN) has been embossed on each card and also stored on a magnetic stripe 603 affixed to the card. In addition, for some cards, the real PAN was also stored in a wirelessly-readable memory chip 604, preferably in a secure element. In some cases, memory chip 604 may also be readable in a "contact" reader using electrical contacts exposed on the surface of the card. Thus, the same card could be used for "swiping" at a magnetic card reader, "tapping" at a wireless reader, or contacting at a contact reader, or its card number could be entered into an Internet shopping site in a card-not-present transaction. However, this traditional arrangement also presented the opportunities for fraud discussed above.

In accordance with embodiments of the invention, the various account-identifying numbers embossed or stored on the card are not all the same. For example, the real PAN identifying the credit account may be embossed on the card, but tokens identifying the same account may be stored on magnetic strip 603 and in chip 604. As is discussed above, a token is a number representing an account, but is not the actual account number. In some embodiments, even the number embossed on the card may be a token. In this way, up to three different tokens (or more if the card supports other payment methods) may be stored on the card. The tokens and/or account number may all be different from each other.

Thus, the token or account number presented by the card when the card is used at a magnetic stripe reader can be different than the token or account number presented by the card at a wireless reader, and can also be different than the number embossed on the card. Any or all of the numbers may be different than the actual account number.

In order to produce such a card, card producer 602 may route the real PAN to a card production token requestor 605, which in turn contacts token service provider requesting the appropriate number of tokens to correspond to the real PAN. Token service provider 303 provides the requested number of tokens, and records the correspondence of the provided tokens represent the account number.

Card producer 602 then produces the actual card 601, with the desired combination of account number and/or tokens. In the example of FIG. 6A, an "emboss token" is embossed on card 601, a "mag stripe token" is stored on magnetic stripe 603, and a "chip token" is stored on chip 604. Card 601 is provided to consumer 301.

Consumer 301 can then use card 601 to conduct transactions in various ways. The different ways of using an account for payment may be called different "domains" for payment. In the example of FIG. 6A, three different domains are shown: the use of the mag stripe token at a magnetic stripe reader, the use of the chip token at a contact or wireless reader, and the use of the emboss token in a card-not-present transaction.

Whichever way consumer 301 presents his or her card 601, the transaction may proceed much as is described above in the description of any of FIG. 3, 4A, or 4B. For example, the "transaction" portion of FIG. 6A is similar to the transaction flow of FIG. 3. That is, the token appropriate for the payment domain being used is forwarded to acquiring computer 304, which may forward the token through a network 305 directly.

In any event, the token will be received at token service provider 303. In addition to the mapping of tokens to account numbers, token service provider 303 also maintains records of domain restrictions on the use of tokens. For example, a mag stripe token may be restricted to use only in transactions conducted at magnetic stripe readers, the chip token may be restricted to use only in transactions conducted at contact or wireless readers, and the emboss token may be restricted to use only in card-not-present transactions.

The transaction information forwarded to token service provider 303 is sufficient for token service provider 303 to determine in which domain the consumer is conducting the transaction. Token service provider 303 can compare the transaction domain with the received token, and determine if the proper token has been received for the transaction domain. If not, token service provider 303 can return a value indicating that the transaction is suspect, may refuse to return the account number, or may take another action to halt the transaction.

This arrangement can prevent various kinds of "cross-domain" fraud. For example, if card 601 has been "skimmed" by an illicit reader at an ATM, a potential thief learns only the mag stripe token. If the potential thief then tries to conduct a card-not-present transaction using the skimmed mag stripe token (possibly believing it to be the real PAN), the transaction will not be successful, because token service provider 303 will recognize that a token designated for one domain (the mag stripe token) is being used in a different domain (a card-not-present transaction), and will prevent the transaction from completing.

In another example, a chip token "sniffed" from a passerby could not be used to conduct a card-not-present transaction. Similarly, if the thief attempts to produce a counterfeit card by recording either the chip token or the emboss token on the magnetic stripe of the counterfeit card, the counterfeit card will not be usable to conduct transactions at magnetic stripe readers because the recorded token will not match the payment domain being used.

Figure 6B:
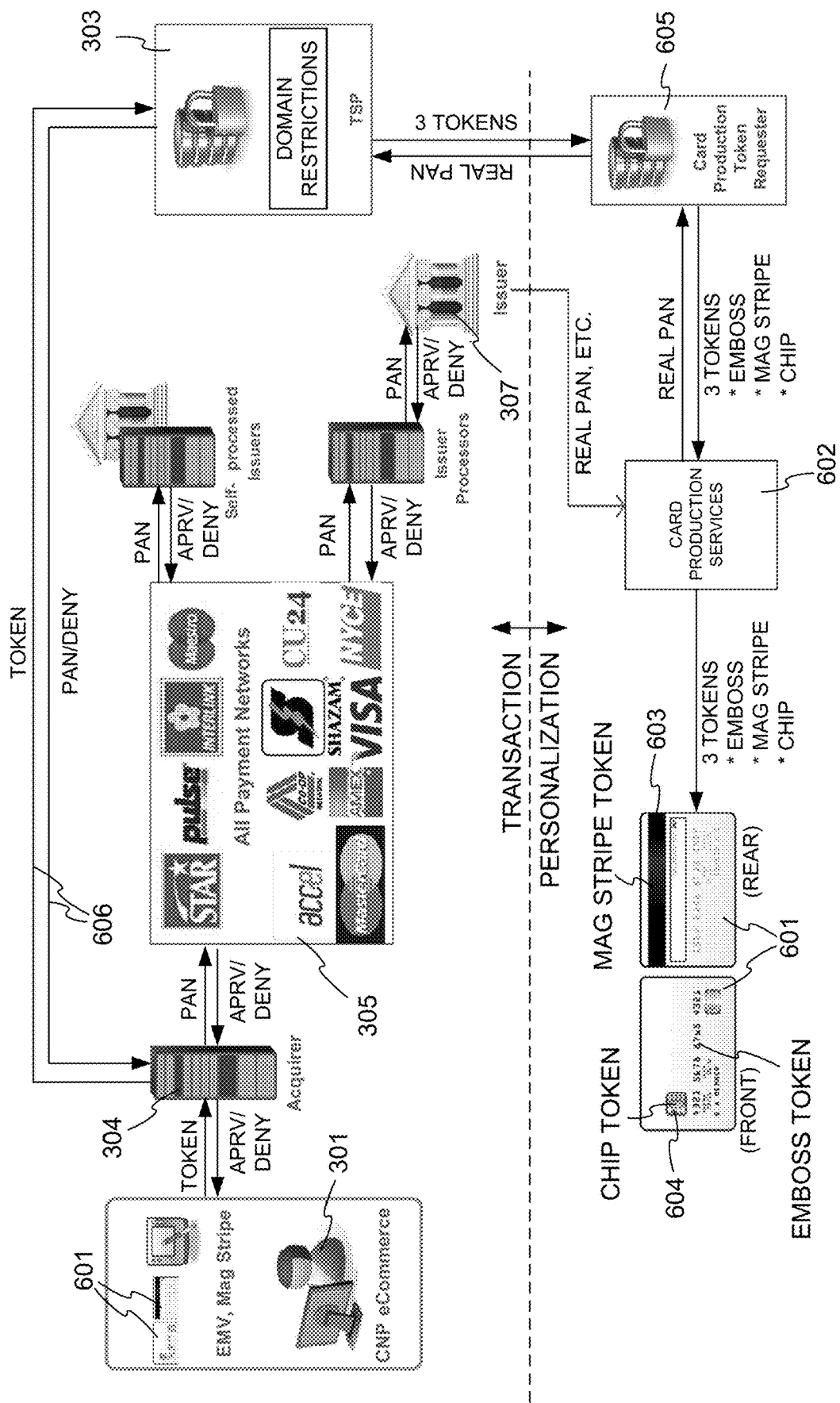
FIG. 6B shows the interactions of certain entities in another example embodiment.

FIG. 6B shows the interactions of certain entities in another example embodiment. In this embodiment the transaction flow may be similar to that shown in FIG. 4A. Acquiring computer 304 contacts 606 token service provider 303 directly to detokenize a token received from consumer 301. If token service provider 303 detects that the token does not match the domain in which the transaction is being conducted, token service provider 303 can pass its disapproval message directly to acquiring computer 304, which can inform the merchant without having to submit the transaction to any network 305. If the token and domain match, then token service provider 303 would return the real PAN to acquiring computer 304, which would pass it to network 305 for routing to the appropriate issuer for a transaction approval decision, as shown in FIG. 4A. Because acquiring computer 304 retrieves the PAN directly from token service provider 303, no interaction between the issuers and token service provider 303 may be needed for the particular transaction illustrated.

Figure 7:
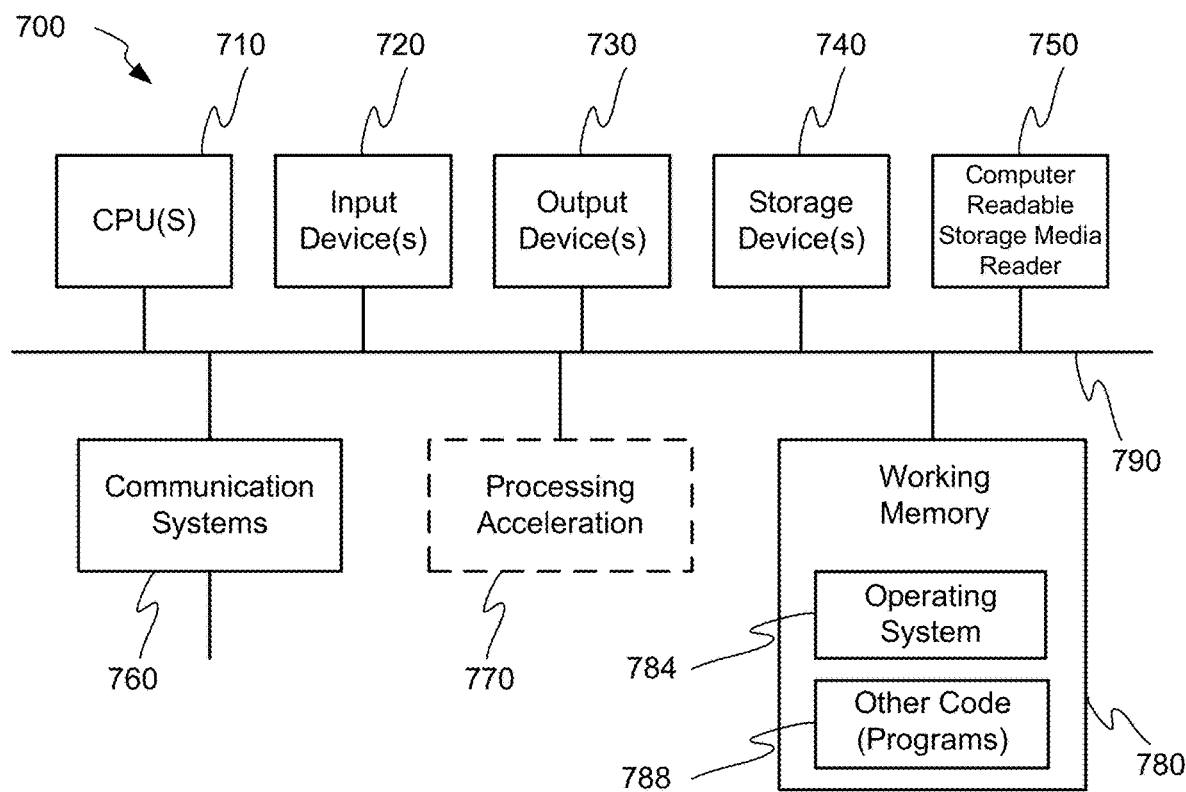
FIG. 7 illustrates a simplified block diagram of a computer system which may be used in embodiments of the invention.

The functions performed by acquiring computer 304, data processor 401, aggregating system 501, token service provider 303, card producer 602, or other entities involved in embodiments of the invention may be performed or facilitated by one or more computer systems specially programmed to do so. FIG. 7 illustrates a simplified block diagram of a computer system 700 which may be used in embodiments of the invention.

Computer system 700 is shown comprising hardware elements that may be electrically coupled via a bus 790. The hardware elements may include one or more central processing units 710, one or more input devices 720 (e.g., a keyboard, mouse, or other input device of combination of devices), and one or more output devices 730 (e.g., a display, printer, or other device or combination of devices). The computer system 700 may also include one or more storage device(s) 740. By way of example, storage device(s) 740 may be disk drives, optical storage devices, solid-state storage device such as a random access memory ("RAM") and/or a read-only memory ("ROM"), which can be programmable, flash-updateable and/or the like.

Computer system 700 may additionally include a computer-readable storage media reader 750, a communications system 760 (e.g., a modem, a network card (wireless or wired), an infra-red communication device, Bluetooth™ device, cellular communication device, etc.), and working memory 780, which may include RAM and ROM devices as described above. In some embodiments, the computer system 700 may also include a processing acceleration unit 770, which can include a digital signal processor, a special-purpose processor and/or the like.

The computer-readable storage media reader 750 can further be connected to a computer-readable storage medium, together (and, optionally, in combination with storage device(s) 740) comprehensively representing remote, local, fixed, and/or removable storage devices plus storage media for temporarily and/or more permanently containing computer-readable information. The communications system 760 may permit data to be exchanged with a network, system, computer and/or other component described above.

The computer system 700 may also comprise software elements, shown as being currently located within a working memory 780, including an operating system 784 and/or other code 788. For the purposes of this disclosure, storage devices 740 and working memory 780 may be collectively referred to as electronic memory. It should be appreciated that alternate embodiments of a computer system 700 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 700 may include code 788 for implementing any or all of the functions of the various elements as described herein. For example, software, stored on and/or executed by a computer system such as system 700, can provide some of the functions of acquiring computer 304, data processor 401, aggregating system 501, or card producer 602 such as those discussed above. Methods implementable by software on some of these components have been discussed above in more detail.

The invention has now been described in detail for the purposes of clarity and understanding. However, those skilled in the art will appreciate that certain changes and modifications may be practiced within the scope of the appended claims.

What is claimed is:

1. A computer-implemented method, comprising:
   receiving, by one or more computer processors, a transaction token obtained from a transaction card during initiation of a particular transaction, the transaction card comprising a plurality of tokens, each of the plurality of tokens identifying a same account associated with the transaction card, wherein:
      at least one of the plurality of tokens comprises the transaction token;
      at least one of the plurality of tokens is different from another of the plurality of tokens; and
      the transaction token corresponds to a real primary account number associated with the transaction card, but does not itself reveal the real primary account number;
   receiving, by the one or more computer processors, an indication of a payment domain in which the transaction token is being used to attempt the particular transaction, wherein the indication of the payment domain in which the transaction token is being used indicates how the transaction token was obtained from the transaction card;
   comparing, by the one or more computer processors, the indicated payment domain, in which the transaction token is being used to attempt the particular transaction, with predetermined payment domain restrictions that specify particular payment domains in which particular tokens of the plurality of transaction tokens of the transaction card are permitted to be used to determine whether use of the transaction token in the indicated payment domain is permitted by the domain restrictions;
   generating an authentication result for the particular transaction based on the comparison;
   in response to the authentication result indicating that the particular transaction is not permitted by the predetermined domain restrictions:
      transmitting the authentication result to an acquirer system for routing to a merchant corresponding to the particular transaction without routing the particular transaction to any payment network;
   in response to the authentication result indicating that the particular transaction is permitted by the predetermined domain restrictions:
      transmitting the authentication result to the acquirer system, wherein transmitting the authentication result to the acquirer system comprises transmitting the real primary account number associated with the transaction token to the acquirer system, wherein the acquirer system routes the particular transaction to a payment network for approval;
   identifying a customer based on the real primary account number; and
   associating the particular transaction with the customer.

2. The computer-implemented method of claim 1, wherein:
   generating the authentication result comprises causing the particular transaction to fail upon a determination that use of the transaction token in the indicated payment domain in which the transaction token is being used to attempt the particular transaction is not permitted by the predetermined domain restrictions.

3. The computer-implemented method of claim 1, further comprising:
   maintaining, in a memory, by the one or more computer processors, a mapping of tokens to account numbers;
   upon a determination that use of the transaction token in the indicated payment domain is permitted by the domain restrictions, accessing the mapping of tokens to account numbers to identify an account number associated with the transaction token; and
   passing the account number to the acquirer system.

4. The computer-implemented method of claim 3, wherein:
   at least some account numbers are assigned multiple tokens.

5. The computer-implemented method of claim 1, wherein:
the plurality of tokens comprise one or more of a number encoded on a magnetic stripe of the transaction card, a number encoded on an electronic chip of the transaction card, and a human-readable number provided on the transaction card.

6. The computer-implemented method of claim 1, wherein:
the predetermined domain restrictions comprise one of more of the following:
use of a human-readable number is restricted to card-not-present transactions;
use of a number encoded on a magnetic stripe of the transaction card is restricted to in-person magnetic stripe reader transactions; and
use of a number encoded on an electronic chip of the transaction card is restricted to contact or wireless reader transactions.

7. The computer-implemented method of claim 1, wherein:
at least one of the plurality of tokens comprises the real primary account number.

8. A token service provider computing system, comprising:
a communications interface;
at least one processor; and
at least one memory having instructions stored thereon that, when executed, cause the at least one processor to:
receive, using the communications interface, a transaction token obtained from a transaction card during initiation of a particular transaction, wherein:
the transaction card comprises a plurality of tokens, each of the tokens identifying a same account associated with the transaction card;
at least one of the plurality of tokens comprises the transaction token;
at least one of the plurality of tokens is different from another of the plurality of tokens; and
the transaction token corresponds to a real primary account number associated with the transaction card, but does not itself reveal the real primary account number;
receive, using the communications interface, an indication of a payment domain in which the transaction token is being used to attempt the particular transaction, wherein the indication of the payment domain in which the transaction token is being used indicates how the transaction token was obtained from the transaction card;
compare the indicated payment domain in which the transaction token is being used to attempt the particular transaction with predetermined payment domain restrictions that specify particular payment domains in which particular tokens of the plurality of transaction tokens of the transaction card are permitted to be used to determine whether use of the transaction token in the indicated payment domain is permitted by the domain restrictions;
generate an authentication result for the particular transaction based on the comparison;
in response to the authentication result indicating that the particular transaction is not permitted by the predetermined domain restrictions:
transmitting the authentication result to an acquirer system for routing to a merchant corresponding to the particular transaction without routing the particular transaction to any payment network;
in response to the authentication result indicating that the particular transaction is permitted by the predetermined domain restrictions:
transmit the authentication result to the acquirer system, wherein transmitting the authentication result to the acquirer system comprises transmitting the real primary account number associated with the transaction token to the acquirer system, wherein the acquirer system routes the particular transaction to a payment network for approval;
identify a customer based on the real primary account number; and
associate the particular transaction with the customer.

9. The token service provider computing system of claim 8, wherein:
generating the authentication result comprises causing the particular transaction to fail upon a determination that use of the transaction token in the indicated payment domain in which the transaction token is being used to attempt the particular transaction is not permitted by the predetermined domain restrictions.

10. The token service provider computing system of claim 8, wherein:
the predetermined domain restrictions comprise one or more of the following:
use of a human-readable number is restricted to card-not-present transactions;
use of a number encoded on a magnetic stripe of the transaction card is restricted to in-person magnetic stripe reader transactions; and
use of a number encoded on an electronic chip of the transaction card is restricted to contact or wireless reader transactions.

11. The token service provider computing system of claim 8, wherein the instructions further cause the at least one processor to:
maintain, in the memory, by the at least one computer processor, a mapping of tokens to account numbers;
upon a determination that use of the transaction token in the indicated payment domain is permitted by the domain restrictions, access the mapping of tokens to account numbers to identify an account number associated with the transaction token; and
pass the account number to the acquirer system.

12. The token service provider computing system of claim 11, wherein:
at least some account numbers are assigned multiple tokens.

13. The token service provider computing system of claim 10, wherein:
the plurality of tokens comprise one or more of a number encoded on a magnetic stripe of the transaction card, a number encoded on an electronic chip of the transaction card, and a human-readable number provided on the transaction card.

14. The token service provider computing system of claim 8, wherein:
at least one of the plurality of tokens comprises the real primary account number.

15. A non-transitory computer-readable medium having instructions stored thereon that, when executed, cause at least one processor to:
receive a transaction token obtained from a transaction card during initiation of a particular transaction, wherein:

the transaction card comprises a plurality of tokens, each of the tokens identifying a same account associated with the transaction card;

at least one of the plurality of tokens comprises the transaction token;

at least one of the plurality of numbers is different from another of the plurality of numbers; and the transaction token corresponds to a real primary account number associated with the transaction card, but does not itself reveal the real primary account number;

receive an indication of a payment domain in which the transaction token is being used to attempt the particular transaction, wherein the indication of the payment domain in which the transaction token is being used indicates how the transaction token was obtained from the transaction card;

compare the indicated payment domain in which the transaction token is being used to attempt the particular transaction with predetermined payment domain restrictions that specify particular payment domains in which particular tokens of the plurality of transaction tokens of the transaction card are permitted to be used to determine whether use of the transaction token in the indicated payment domain is permitted by the domain restrictions;

generate an authentication result for the particular transaction based on the comparison;

in response to the authentication result indicating that the particular transaction is not permitted by the predetermined domain restrictions:

transmitting the authentication result to an acquirer system for routing to a merchant corresponding to the particular transaction without routing the particular transaction to any payment network;

in response to the authentication result indicating that the particular transaction is permitted by the predetermined domain restrictions:

transmit the authentication result to the acquirer system, wherein transmitting the authentication result to the acquirer system comprises transmitting the real primary account number associated with the transaction token to the acquirer system, wherein the acquirer system routes the particular transaction to a payment network for approval;

identify a customer based on the real primary account number; and associate the particular transaction with the customer.

16. The non-transitory computer-readable medium of claim 15, wherein:

generating the authentication result comprises causing the particular transaction to fail upon a determination that use of the transaction token in the indicated payment domain in which the transaction token is being used to attempt the particular transaction is not permitted by the predetermined domain restrictions.

17. The non-transitory computer-readable medium of claim 15, wherein:

the predetermined domain restrictions comprise one or more of the following:

use of a human-readable number is restricted to card-not-present transactions;

use of a number encoded on a magnetic stripe of the transaction card is restricted to in-person magnetic stripe reader transactions; and use of a number encoded on an electronic chip of the transaction card is restricted to contact or wireless reader transactions.

* * * * *